(12) United States Patent
Knowles et al.

(10) Patent No.: US 9,528,700 B2
(45) Date of Patent: *Dec. 27, 2016

(54) MULTIPLE OUTPUT STREAM PARTICLE BENEFICIATION AND CHEMICAL PROCESSING

(71) Applicant: The SEFA Group, Inc., Lexington, SC (US)

(72) Inventors: Jimmy C. Knowles, Chapin, SC (US); John M Castleman, III, Chattanooga, TN (US)

(73) Assignee: The SEFA GROUP, INC., Lexington, SC (US)

( * ) Notice: Subject to any disclaimer, the term of this patent is extended or adjusted under 35 U.S.C. 154(b) by 48 days.

This patent is subject to a terminal disclaimer.

(21) Appl. No.: 14/121,524

(22) Filed: Sep. 15, 2014

(65) Prior Publication Data

US 2015/0007759 A1    Jan. 8, 2015

Related U.S. Application Data (63) Continuation of application No. 13/095,374, filed on Apr. 27, 2011, now Pat. No. 8,833,279, and a
(Continued)

(51) Int. Cl.
*C04B 18/08* (2006.01)
*F23G 5/32* (2006.01)
(Continued)

(52) U.S. Cl.
CPC ............. *F23J 15/022* (2013.01); *C04B 18/08* (2013.01); *C04B 18/146* (2013.01); *F23G 5/24* (2013.01);
(Continued)

(58) Field of Classification Search
CPC ........ C04B 18/08; C04B 18/146; B04B 20/04; F23G 5/32; F23G 5/24; F23G 2209/30; F23J 15/00; F23J 15/022
(Continued)

(56) References Cited

U.S. PATENT DOCUMENTS

3,557,726 A * 1/1971 Montgomery .......... F23G 5/444
110/244
4,890,562 A * 1/1990 Gitman .................... F23G 5/12
110/236
(Continued)

*Primary Examiner* — Jacob T Minskey
*Assistant Examiner* — Minh-Chau Pham
(74) *Attorney, Agent, or Firm* — Miles B. Dearth (57) ABSTRACT

A reactor (110) serves to combust residual carbon in fine particulate matter, remove a contaminant from fine particulate matter, or change the composition of fine particulate matter. The reactor output is processed by particle collection devices (115, 125, 140, 155, 175) and heat exchangers (135, 150, 165) to provide particle outputs (118, 124, 131, 144, 159) of different sizes. A contaminant, such as carbon or a metal, is combusted, vaporized, volatized, broken down, or substantially appears on one particle output (144) so that another particle output and the exhaust gas (142) are substantially contaminant-free. Different outputs can also be selectively mixed, as desired, to product a combined output (171). Fly ash and silica fume can be processed separately or together to reduce the amount of unburned carbon in both. Metals can also be removed from the fine particulate matter. Kaolin can also be processed to produce metakaolin.

9 Claims, 4 Drawing Sheets

Related U.S. Application Data continuation-in-part of application No. 11/424,364, filed on Jun. 15, 2006, now Pat. No. 8,960,107.

(60) Provisional application No. 61/328,268, filed on Apr. 27, 2010, provisional application No. 60/691,729, filed on Jun. 17, 2005.

(51) Int. Cl.
  *F23G 5/24* (2006.01)
  *F23J 15/00* (2006.01)
  *F23J 15/02* (2006.01)
  *C04B 18/14* (2006.01)

(52) U.S. Cl.
  CPC ............... *F23G 5/32* (2013.01); *F23J 15/00* (2013.01); *F23G 2209/30* (2013.01); *Y02W 30/92* (2015.05); *Y02W 30/94* (2015.05)

(58) Field of Classification Search
  USPC ............ 110/345, 165 A, 215, 216; 55/385.1; 96/306; 422/184.1, 608, 611, 613
  See application file for complete search history.

(56) References Cited

U.S. PATENT DOCUMENTS

| | | | | |
|---|---|---|---|---|
| 4,969,930 | A * | 11/1990 | Arpalahti | C10J 3/54 110/347 |
| 5,408,942 | A * | 4/1995 | Young | F23C 99/005 110/243 |
| 6,886,476 | B2 * | 5/2005 | Katsui | F23G 5/245 110/185 |
| 8,833,279 | B1 * | 9/2014 | Knowles | F23G 5/32 110/165 A |
| 8,960,107 | B2 * | 2/2015 | Knowles | C04B 18/08 110/213 |
| 2004/0123786 | A1 * | 7/2004 | Crafton | F23G 5/30 110/346 |

* cited by examiner

MULTIPLE OUTPUT STREAM PARTICLE BENEFICIATION AND CHEMICAL PROCESSING

CROSS-REFERENCE TO RELATED APPLICATIONS

This application is a continuation of nonprovisional U.S. patent application Ser. No. 13/095,347, filed Apr. 27, 2011, now U.S. Pat. No. 8,833,279 which is a nonprovisional filing of U.S. Provisional Patent Application Ser. No. 61/328,268, filed Apr. 27, 2010, entitled "Multiple Output Stream Fly Ash Beneficiation Process", and application Ser. No. 13/095, 347 is a continuation-in-part of U.S. patent application Ser. No. 11/424,364, filed Jun. 15, 2006, now U.S. Pat. No. 8,960,107 entitled "Method And Apparatus For Turbulent Combustion Of Fly Ash", abandoned which claims the priority of U.S. Provisional Patent Application Ser. No. 60/691,729, filed Jun. 17, 2005, entitled "Method And Apparatus For Turbulent Combustion Of Fly Ash".

FIELD OF THE INVENTION

The present invention relates to the processing of fine particulate matter to modify its chemical and/or its physical characteristics, and/or modify the chemical and/or physical characteristics of a contaminant associated with the fine particulate matter for removal of the contaminant, for example, but not limited to, the combusting of unburned carbon in fly ash or silica fume, the removal of metals, and the conversion of kaolin to metakaolin.

BACKGROUND OF THE INVENTION

There are many by-products and natural products which have a value and/or utility limited partly or largely by the contaminants included therein. The nature and amount of the contaminant can, in cases, eliminate all substantial uses of the product, which often results in the product being transported to, and dumped in, a landfill.

For example, the positive economic and technical benefits of utilizing fly ash as a replacement for cement in concrete have been well established. Further, it is well known that ever increasing environmental regulations on coal-fired plants has led to the development of several types of fly ash beneficiation processes designed to make a product suitable for utilization.

The greatest barrier to higher utilization rates for coal fly ash is the heterogeneous nature of fly ash itself. The single greatest cause of heterogeneity within coal fly ash stems from residual unburned carbon, which remains in the fly ash in varying amounts—depending on the efficiency of the coal combustion process that produced the fly ash. These unburned carbon particles are typically agglomerations of devolatized coal char and partially vitrified inorganic inclusions. These tiny inorganic inclusions would have become separate, discrete fly ash particles if the coal had been able to burn completely when originally fired in the boiler.

Because coal fly ash is primarily inorganic mineral matter, the preferred uses for fly ash intend to take advantage of the specific nature and characteristics of the mineral matter—e.g., reactive glass, spherical morphology, particle size distribution, etc. There are significant differences between the nature and character of the mineral matter and the residual carbon in fly ash, and these differences affect the performance of fly ash; particularly, the differences in density, color, surface chemistry, adsorption, etc.

Consequently, in some applications that may benefit from the unique character of the mineral matter in fly ash, the very presence of any unburned carbon negatively affects the performance of the resulting product. This results in a reduction in the utilization rates of fly ash. Additionally, due to differences in the combustion techniques and/or efficiency of different coal-fired boilers and differences in the composition of the coal being burned, inconsistent amounts of unburned carbon in the raw fly ash product further limits the applications for the fly ash and results in still lower utilization rates for fly ash.

There are other causes of heterogeneity in fly ash that are often cited as barriers to increased beneficial use of fly ash, especially when used to produce non-cementious products, such as plastics, rubber, paints, adhesives, etc. Some of those causes are:

Contaminants (e.g., ammonia, activated carbon, etc.) introduced through the combustion and pollution control processes and which are collected in the fly ash;

Variable ash chemistry and color from coal switching/blending;

Agglomerates of mineral matter from high temperature and/or fouling; and

Unburned organics and/or variable ash chemistry from co-firing with alternative fuels, such as biomass and pet coke.

SUMMARY OF THE INVENTION

A reactor heats a feedstock in the form of particulate matter to alter the chemical and/or physical nature of the feedstock or a contaminant in the feedstock to remove the contaminant. Some examples are calcination of certain materials, combusting unburned carbon from fly ash or silica fume, removing water, including crystalline water, from fly ash, conversion of kaolin to metakaolin, etc. Particle collection devices and heat exchangers then separate and cool the output from the reactor into multiple particle outputs of different sizes. If the feedstock contains a contaminant, such as but not limited to selenium or an oxide of selenium, then the contaminant can be removed from the feedstock and caused to substantially appear on one of the particle outputs, with other particle outputs and exhaust gases being substantially free of the contaminant, or to just substantially appear in the exhaust gas. Different input feedstocks can be co-processed, and different output products can be selectively mixed, as desired, to produce a desired or combined output. For example, silica fume can be co-processed with fly ash to reduce the amount of unburned carbon in both the silica fume and the fly ash, which can be provided as a combined product or as separate output products. In another example, kaolin can be co-processed with the fly ash to produce metakaolin, and the processed fly ash and the metakaolin can be provided as separate output products. Fly ash is a convenient source of heat for the reactor, but is not the only possible source, as other fuels can be used. These examples illustrate that one or more additional input feedstock(s) can be processed with or without fly ash to effect desired physical and/or chemical changes to the input feedstock(s) and/or contaminants therein. The input feedstock(s) are not, however, limited to the above examples.

BRIEF DESCRIPTION OF THE DRAWING

FIGS. 1A and 1C show another exemplary embodiment of a system for processing particulate matter using several particulate collection devices with two heat exchangers.

DETAILED DESCRIPTION OF THE INVENTION

Figure 1A:
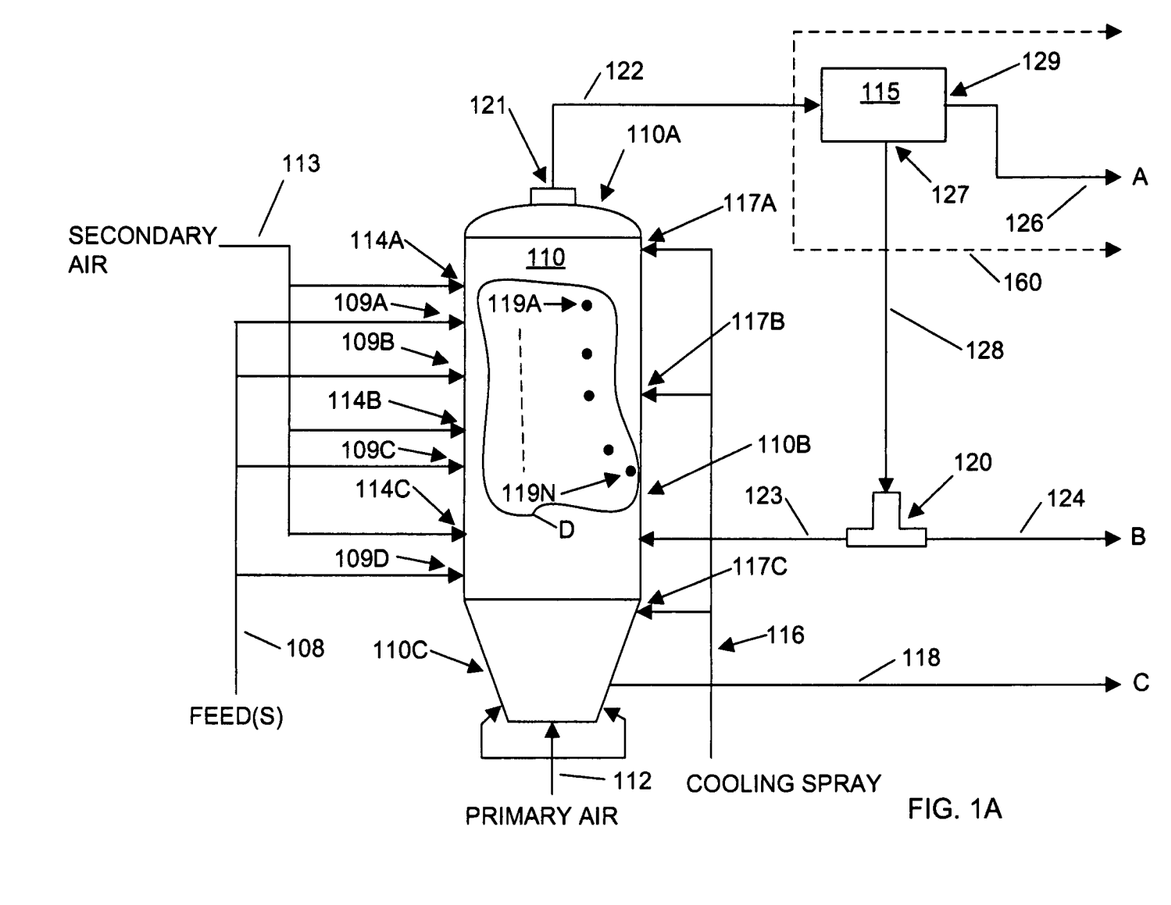
FIGS. 1A and 1B show one exemplary embodiment of a system for processing particulate matter using several particulate collection devices and a heat exchanger.
Figure 1B:
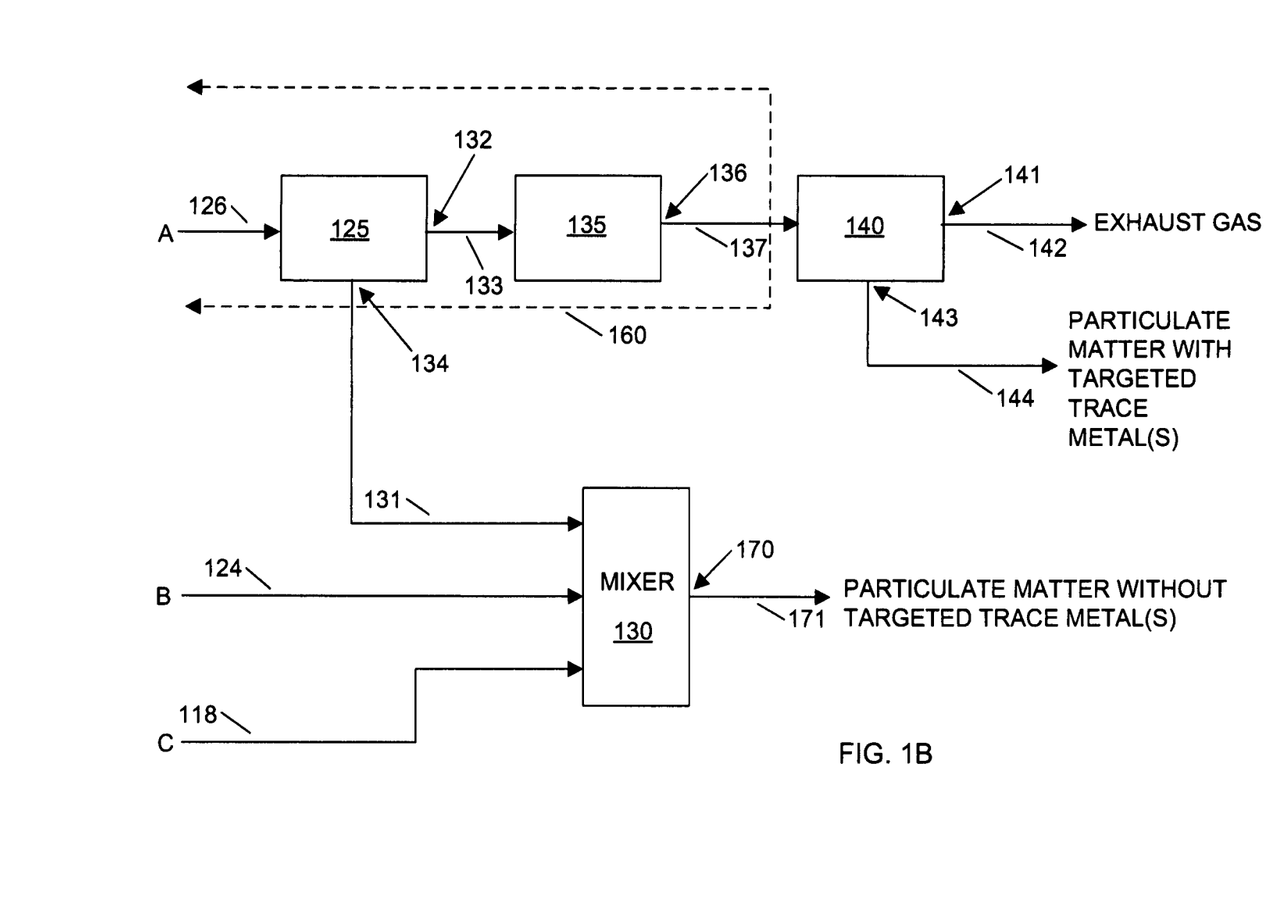
Figure 1C:
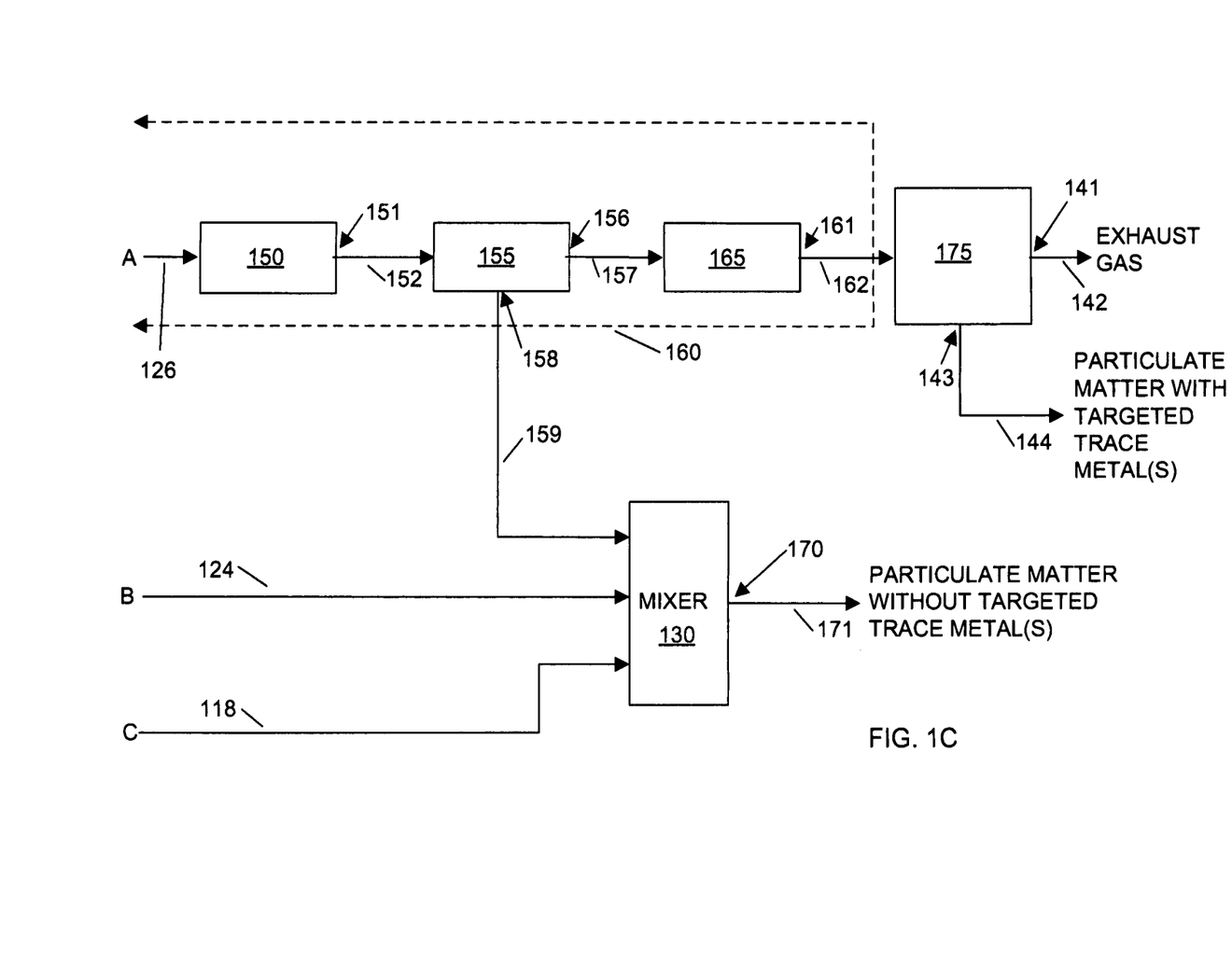

FIGS. 1A-1C show two exemplary embodiments of a system for processing particulate matter to produce at least two different output product streams. FIGS. 1A and 1B show a system for processing particulate matter using several particulate collection devices and an intermediate heat exchanger. FIGS. 1A and 1C show another system for processing particulate matter using several particulate collection devices with two heat exchangers.

FIG. 1A is common to both implementations and shows a reactor 110, a particulate collection device (PCD) 115, and a solids return control device (SRCD) 120. For convenience of illustration and discussion, reactor 110 is shown as having three sections: a top section 110A, a central section 110B, and a bottom section 110C. The sections need not have similar volumes or dimensions.

The top section 110A, although shown generally as a dome, may be another shape. For example, the top section 110A may be a simple flat lid which seals the upper end of the central section 110B. Also, although the exit 121 is shown as being at the top of the dome in top section 110A, exit 121 may be at a different point on the dome of top section 110A, may be at a desired point on a differently-shaped top section 110A, or may even be near the upper end of the central section 110B. It is only important that there be an exit point somewhere near the upper end of the central section 110B.

The central section 110B is where most of the chemical reactions and physical changes occur, although some reactions and changes may also occur in the top section 110A and in the bottom section 110C. The central section 110B preferably has multiple input points (ports) 109, 114, 117, and multiple output points (ports) 119. For convenience of illustration, FIG. 1A shows a single conduit 108 feeding the various input ports 109. Valves (not shown) may be used to select which input ports are to be active. If desired, there may be a plurality (not shown) of conduits 108, each conduit 108 selectively feeding a different input port (or ports) than other conduits 108. This allows different feedstocks or compositions, including but not limited to reagents and reactants, to be introduced at different input points so as to obtain the desired output product or products.

Valves (not shown) may be used to select which input ports 114 are to be provided secondary air via conduit 113. This provides for better control of the operating conditions in the reactor 110. Further, these input ports 114 may also be used to introduce substances, including but not limited to reagents and reactants, other than secondary air. If desired, there may be a plurality (not shown) of conduits 113, each conduit 113 selectively feeding a different input port (or ports) than other conduits 113. This allows different feedstocks or compositions to be introduced at different input points so as to obtain the desired output product or products.

Valves (not shown) may be used to select which input ports 117 are to be provided cooling spray via conduit 116. This provides for better control of the operating conditions in the reactor 110. Further, these input ports 117 may also be used to introduce substances, including but not limited to reagents and reactants, other than cooling spray. If desired, there may be a plurality (not shown) of conduits 116, each conduit 116 selectively feeding a different input port (or ports) than other conduits 116. This allows cooling spray and/or other liquids to be introduced at different input points so as to obtain the desired output product or products.

An input port 109, 114, 117 may be a simple opening in the wall of the reactor 110, or may be a conduit protruding into the reactor 110, or may be a nozzle. The use of a conduit or a nozzle (not shown) allows air, cooling spray, or an input feedstock, to be injected into the reactor in a desired orientation. For example, the material to be injected may be injected radially inward, in the direction of (or against) the flow inside the reactor, and/or upwardly (or downwardly). The orientation of injection can be used to control, for example, the duration that a particle will be inside the reactor and the degree to which that particle will be altered.

The bottom section 110C, although shown as a separate component, may be a continuation of the central section 110B with the walls of the central section 110B tapering inwardly downward a desired distance to provide a desired diameter at the bottom of section 110C. Although the bottom section 110C is shown as having a flat bottom surface, it may have another desired shape, such as a cone or a bowl. Also, although the primary air 112 is shown as being provided to the bottom section 110C, the primary air may be provided at an alternate or additional location, such as toward the lower end of central section 110B. Larger and/or coarser particles are removed from the reactor 110 at or near the bottom section 110C, such as via conduit 118. It is only important that there be an input point somewhere near the lower end of the central section 110B for the primary air input, and an exit point somewhere near the lower end of the central section 110B for removing the larger and/or coarser particles.

For convenience of illustration, FIG. 1A shows a single conduit 112 feeding the various primary air input ports. If desired, valves (not shown), may be used to select which input ports are to be active. Further, there may be a plurality (not shown) of conduits 112, each conduit 112 selectively feeding different a input port (or ports) than the other conduits 112. An input port for the primary air may be a simple opening in the wall of the reactor 110, may be a conduit protruding into the reactor 110, or may be a nozzle. These techniques allow primary air to be injected into the reactor in a desired orientation to control, for example, the duration that a particle will be inside the reactor and the degree to which that particle will be altered.

A PCD separate particulate matter in the input stream according to some predetermined criteria, such as the size of the particles. Some examples of PCDs are cyclones and baghouses. Some examples of SRCDs are J-valves and L-valves. Other types of SRCDs may be used which can selectively enable or disable flow of the ash through the device, or route the ash to different outputs of the device.

The system described herein can be used for processing fine particulate matter. Fine particulate matter is finely divided material which can be transported pneumatically, which can be injected into the reactor, and most of which can be upwardly buoyed by the air flow within the reactor. The fine particulate matter typically, but not necessarily, has a low BTU value, meaning that it is not generally used as a fuel. It may even be the result of combusting a fuel, such as the fly ash produced by combusting coal. Most of the particles in fine particulate matter preferably, but not necessarily, have a size less than ⅜ inch and, even more preferably, will pass through a 16 mesh screen. Some examples of fine particulate matter are ash and silica fume. Ash is the remaining mineral matter after a combustion process involving organic (carbon-containing) matter. Thus, the term ash includes, for example, fly ash and wood ash. Organic matter includes, for example, coal, hydrocarbons, and biomass, such as wood, switch grass, agricultural and residential plant waste, etc. Many types of feedstock may be processed, singly or concurrently, in the system described below. For convenience and clarity of discussion, however, the description herein primarily focuses on the processing of fly ash particles as the feedstock or feed ash to remove or reduce residual carbon levels and/or other contaminants in the feedstock fly ash particles.

Reactor 110 may be, and preferably is, preheated to the desired operating temperature by the injection of oil, gas, or other flammable liquid or vapor through any suitable port 109, 114, 117, or a different port (not shown). The operating temperature should be high enough to modify the contaminant so that it can be removed from the particulate matter. Removal of the contaminant may be accomplished by, for example, combusting the contaminant, vaporizing the contaminant, or volatizing the contaminant.

After the reactor has reached the desired operating temperature then the reactor 110 is provided with feedstock ash via conduit 108 at the desired levels or input ports 109, primary air via conduit 112, secondary air via conduit 113, and, optionally, cooling spray via conduit 116 as needed. Primary air is injected at or near the bottom of the reactor 110. The secondary air is preferably injected into the reactor 110 at several levels 114A, 114B, 114C, and the amount of air injected at each level is preferably independently controllable. Fly ash is preferably injected above the primary air injection level. The primary and secondary air promote the upward movement of the fly ash within the reactor 110 and facilitate beneficiation, that is, reduction or removal of unburned carbon in the fly ash. "Air" includes air, and also may include oxygen, other gases, and mixtures thereof.

The cooling spray may be, and is preferably, injected into the reactor 110 at several levels 117A, 117B, 117C, and the amount of water injected at each level is preferably independently controllable to control the operating temperature and conditions inside the reactor 110 and to cause or maintain the fly ash particles to be in finely divided state. The cooling spray is preferably water. Cooling spray may also be injected, if desired, into conduits 122 (FIG. 1A), 126 (FIG. 1A), 133 (FIG. 1B), 137 (FIG. 1B), 152 (FIG. 1C), 157 (FIG. 1C), 162 (FIG. 1C), and/or other points.

Typically, most of the coarser or larger fly ash particles will move toward the bottom section 110C and can be removed via conduit 118 to provide an output C of the reactor. Also, most of the fine fly ash particles will typically exit with the flue gas at the exit 121. These are not required to be the only output points, however. The average particle size or degree of carbon reduction at any elevation or cross section in the reactor may be different. Fly ash can therefore preferably be removed from the reactor at multiple locations (FIGS. 2A and 2B), either laterally or vertically, to obtain a product with specific characteristics, such as particle size or carbon reduction.

The reactor 110 is preferably operated within a temperature range of about 1000 degrees F. to about 2200 degrees F., a gas residence time of 3 to 20 sec, an oxygen concentration ranging between reducing conditions to 20% excess O2, solids mass flux of 10 to 100 inches water gauge (wg), and recycle ratio of 10 to 1. These are preferred parameter ranges, but the actual preferred ranges will vary, and operation outside of these ranges may occur in order to achieve a particular result or characteristics of the feedstock ash and/or the type of beneficiation desired. For example, in order to produce a Class F fly ash product with very little or no residual carbon, the preferred temperature range is 1400 to 1800 degrees F. at a residence time of 6 to 12 sec and with excess O2 of 2 to 10%. More preferably, the temperature range is 1500 to 1700 degrees F. at a residence time of 8 to 10 sec and with excess O2 of 3 to 8%. The actual operating temperature, oxygen level, and residence time will depend upon the initial carbon level in the raw fly ash and the desired carbon level in the processed fly ash.

The particles leaving the exit 121 are transported via a conduit 122 to the input of a PCD 115. The PCD is operated within a temperature range of 1000 degrees F. to 2200 degrees F., an oxygen concentration ranging between reducing conditions to 20% excess O2; solids and gas pressure differential of 0 to 50 inches wg. The preferred ranges for these parameters will vary based on the specific characteristics of the feedstock ash and/or the type of beneficiation desired. For example, in order to produce a Class F fly ash product with very little or no residual carbon, the preferred temperature range is 1400 to 1800 degrees F., with excess O2 of 2 to 10%. More preferably, the temperature range is 1500 to 1700 degrees F., with excess O2 of 3 to 8%.

The larger of the fly ash particles entering the PCD 115 from the exit 121 will fall to the bottom of the PCD 115 and exit the PCD 115 as a particulate output 127 on conduit 128. These fly ash particles may then be directed by the SRCD 120 back into the reactor via conduit 123 or may be transported via conduit 124 to provide an output B. The amount of solids returned to the reactor can be varied in order to control the reactor operating conditions to the desired level, such as temperature or mass flux. For example, hot fly ash may be returned to add additional hot mass to the inside of the reactor to enhance heating or stabilize the temperature. Also, fly ash which has been cooled, such as by the cooling water spray, may be returned to add cooler mass to the inside of the reactor to reduce heating or stabilize the temperature. The operating temperature at the output of the SRCD 120 will be in the range of 1000 to 2200 degrees F., depending upon the operating conditions of the reactor 110 and the amount of cooling spray injected. The preferred operating conditions are dependent on the specific output product desired.

In another example, the SRCD 120 may be controlled to cause some, most, or all of the ash at the bottom of the PCD 115 to be redirected to the reactor 110 via conduit 123. Thus, some or all of the particles collected by the PCD may make multiple passes through the reactor 110, thereby increasing the residence time of the particles in the reactor 110, reducing the residual carbon levels in the particles, and influencing the operating conditions of the reactor such as temperature or mass flux.

In another example, SRCD 120 may be controlled to cause little, or none, of the ash at the bottom of PCD 115 to be redirected to the reactor 110. Thus, most or all of the particles collected by the PCD 115 only make one pass through the reactor 110.

The output 121 at the top of the PCD 115 is hot flue gas which contains the combusted carbon and any contaminants, such vaporized or volatized metals, and fly ash particles which have not been removed by the PCD 115, typically fine to ultra-fine fly ash particles. This output is provided via conduit 126 to become output A. The operating temperature at this point is 1000 to 2200 degrees F. and the oxygen concentration ranging between reducing conditions to 20% excess O2, depending upon the operating conditions of the reactor 110 and the amount of cooling spray injected. The preferred operating conditions are dependent on the specific product desired.

FIG. 1A also shows a plurality of outputs 119A-119N to extract beneficiated fly ash from various locations within the reactor. For ease of illustration, conduits from these outputs 119 are not shown. These outputs 119 may be routed directly to a desired process or collection area, may be routed to the mixer 130 in FIGS. 1B and 1C, may be directly combined with other outputs, etc. Each output may be individually controlled by use of, for example, an SRCD. Construction of these outputs 119 is described with respect to FIGS. 2A and 2B. For convenience of discussion, these outputs 119 are referred to as output D.

Thus, there are multiple outputs from the reactor 110: output A is the hot flue gas which includes the combusted carbon, vaporized or volatized metals, and the fine to ultra-fine beneficiated fly ash particles, output B is the beneficiated medium-size fly ash particles extracted by the PCD, output C is the beneficiated larger or coarser fly ash particles, and output D is fly ash particles with selected chemical and/or physical characteristics.

Preferably, the operating temperature inside the reactor, the temperature of the hot flue gas and fly ash particles at the exit 121 of the reactor, and the temperature of the hot flue gas and fly ash at the output 129 of the PCD 115, are all above the vaporization point of any elemental or volatized metals targeted for removal. For convenience of discussion, both vaporized elemental metals and vaporized volatized metals will be referred to as "vaporized metals" unless stated otherwise or unless required by the context in which the term is used. If these temperature conditions are met, the vaporized metals will remain entrained in the hot flue gas and will not condense on or attach to the fly ash particles. Output A will therefore contain hot flue gas, beneficiated fly ash not removed by the SRCD 115, and vaporized metals. As outputs B, C, and D contain fly ash particles which were removed from the flue gas while still above the vaporization point of the metals, there will be little or none of the metal on these beneficiated fly ash particles.

The term "conduit" is not limiting as to size, shape or construction, and includes, for example, a tube, passage, channel, pipe, shaft, or duct, which allows or facilitates movement of fly ash, liquids, gases, particulate matter, and/or other materials from one place to another. Likewise, the term "output" is not limiting as to size or shape, and includes, for example, a hole, port, bore, or open area, from which material, such as fly ash particles, may leave an object, such as a reactor, PCD, or heat exchanger, and may also indicate, according to the context in which it is used, the material itself.

Tuning now to FIG. 1B, the output A goes into a second PCD 125. Some of the fine fly ash exits the output 134 at the bottom of the PCD 125 and, preferably but not necessarily, is provided via a conduit 131 to a mixer 130. The temperature inside the second PCD 125 is also above the vaporization temperature of the targeted metals, so the output 132 of PCD 125 contains the hot gas, the vaporized metals, and any fine or ultra-fine residual fly ash particles, i.e., those fly ash particles not removed by the PCDs 115 or 125.

The output 132 of PCD 125 is then provided via a conduit 133 to a heat exchanger 135, whereby the hot gases are cooled below the condensation temperature of the targeted trace metal or metals. This cooling causes the metal vapors to condense and adhere to the residual fly ash particles. The output 136 of the heat exchanger 135 is then provided via a conduit 137 to a PCD 140, which removes substantially all of the residual fly ash particles, now metal-laden. The PCD 140 then provides a substantially metal-reduced or metal-free exhaust gas output 141 via a conduit 142, and provides an output 143 of fly ash laden with targeted trace metals via a conduit 144. The conditions at output 143 are preferably a temperature in the range of 250 to 400 degrees F., with an oxygen concentration ranging of 2 to 20%. The preferred ranges for these parameters will vary based on the specific characteristics of the feedstock ash and/or the type of beneficiation desired.

Optionally, heat exchanger 135 will not cool the hot gases to the condensation point of the vaporized metal. Therefore, the output 143 will be fine fly ash with little or no metal, but the exhaust gas output 141 will contain the vaporized metal, which can be removed by a subsequent process (not shown).

The PCDs 115 and 125, and the heat exchanger 135, may be considered to be components of a particle collection and cooling section 160. In another embodiment, the particle collection and cooling section does not include PCD 115, so SRCD 120 is not used. The particles that would be collected by PCD 115 are, instead, collected by PCD 125. This may be acceptable if the output of PCD 125 is still appropriate for the particular application. The elimination of PCD 115 and SRCD 120 is not preferred, however, as these devices conveniently assist in maintaining the reactor temperature at the desired level.

In another embodiment, the particle collection and cooling section does not include PCD 125, so the output on conduit 131 is not available. The particles that would be collected by PCD 125 are, instead, collected by PCD 115 or PCD 140, depending upon the particle size requirements of the particular application.

In another embodiment, PCD 140 is not used. This may be acceptable if the output 136 of PCD 135 is appropriate for the particular application.

Turning now to FIG. 1C, the output A goes into a first heat exchanger 150, which cools the temperature of the hot gas so that the hot gas can be processed by a PCD 155, but the temperature of the hot gas is still above the vaporization point of the targeted trace metals. The output 151 of the heat exchanger 150 is provided via a conduit 152 to the PCD 155, which removes some of the fly ash particles. Because the temperature is still above the vaporization temperature, the output 158 of the PCD 155 is substantially metal reduced or metal free fine fly ash. This output is provided via a conduit 159 to the mixer 130.

The other output 156 of the PCD 155 is slightly-cooled hot gas, which still contains vaporized metals and some fine and ultra-fine fly ash particles. This output is provided via a conduit 157 to the second heat exchanger 165, whereby it is cooled below the condensation point of the targeted metals. This cooling causes the metals to condense and adhere to the residual fly ash particles. The output 161 of the heat exchanger 165 is then provided via a conduit 162 to another PCD 175, which removes substantially all of the residual fly ash particles, now metal-laden. The PCD 175 then provides a substantially metal-reduced or metal-free exhaust gas output 141 via a conduit 142, and provides an output 143 of fly ash which is with laden with the trace metals via a conduit 144.

Optionally, heat exchanger 165 will not cool the hot gases to the condensation point of the vaporized metal. Therefore, the output 143 will be fine fly ash with little or no metal, but the exhaust gas output 141 will contain the vaporized metal, which can be removed by a subsequent process (not shown).

The PCDs 115 and 155, and the heat exchangers 150 and 165, may be considered to be components of a particle collection and cooling section 160. In another embodiment, the particle collection and cooling section does not include PCD 115, so SRCD 120 is not used. The particles that would be collected by PCD 115 are, instead, collected by PCD 155. This may be acceptable if the output of PCD 155 is still appropriate for the particular application. The elimination of PCD 115 and SRCD 120 is not preferred, however, as these devices conveniently assist in maintaining the reactor temperature at the desired level.

In another embodiment, the particle collection and cooling section does not include PCD 155, so the output on conduit 159 is not available. The particles that would be collected by PCD 155 are, instead, collected by PCD 115 or PCD 175, depending upon the particle size requirements of the particular application.

In another embodiment, the particle collection and cooling section does not include heat exchanger 150. This may be acceptable if the PCD 155 can operate at the higher temperatures which will then be present.

In another embodiment, PCD 175 is not used. This may be acceptable if the output 161 of PCD 165 is appropriate for the particular application.

At this point it will be noted that both exemplary configurations, FIGS. 1A and 1B, and FIGS. 1A and 1C, provide multiple output streams: substantially metal-free and fly ash-free exhaust gas via conduit 142, metal-laden fly ash via conduit 144, substantially metal-reduced or metal-free beneficiated fly ash via conduit 131 or 159, substantially metal-reduced or metal-free medium-size beneficiated fly ash particles via conduit 124, substantially metal-reduced or metal-free beneficiated fly ash with larger or coarser particles via conduit 118, and substantially metal-reduced or metal-free beneficiated fly ash with selected characteristics via output D. Note also that the carbon in the fly ash feedstock has also been substantially reduced or completely removed.

Thus, if selenium is the targeted metal, the process will simultaneously produce at least one product stream with selenium levels below the detection limit for most tests, and another product stream with elevated levels of selenium.

Typically, exhaust gas conduit 142 is connected to a vacuum source, such as an induced draft fan or a flue gas treatment system, which pulls the exhaust gas out of the PCD 140 or 175.

It should be noted that, in operation, substantially all of the particles in the reactor 110 are airborne, that is, the particles do not reside in a bed. Larger and coarser particles may drop out of the airflow but this is for removal via conduit 118 and not for forming a bed.

The amount of contaminant in the particles, how much of the contaminant is to be removed, the size, density and weight of the particles, the difficulty or ease with which the contaminant is removed, and the temperature inside the reactor influence the rate of injection of air, oxygen, other gases, or mixtures thereof via the primary and secondary air ports, and the number, location, and orientation of the injection devices. These parameters are easily determined by routine experimentation by one of ordinary skill in the art who has had the benefit of reading the present disclosure.

In one embodiment, these different output streams are maintained separate and are provided for further separate use.

In another embodiment, one or more of these streams may be combined to provide a product with a desired mix of fine, medium and/or larger or coarser fly ash particles. For example, in FIG. 1B, conduits 118, 124, and 131 are provided to a mixer 130, and in FIG. 1C, conduits 118, 124, and 159 are provided to a mixer 130. As mentioned, one or more of output D may also be provided to mixer 130 but, for ease of illustration, is not shown. These variously-sized fly ash particles may be combined in the desired ratios to provide a desired product at the output 170 of mixer 130, which may then be provided via conduit 171 to another process. Control valves (not shown) in the conduits 118, 124, 131, 159 may be used to control the relative amount of each size fly ash particle in the output product. Thus, the output 170 may be selectively varied from being only one size fly ash (fine, medium, larger/coarser) to a desired ratio mixture of any two sizes, or even to a desired ratio mixture of three or more types or sizes. A carbon-containing fly ash particle injected toward the lower part of the reactor 110 will typically have lower and lower levels of residual carbon as it moves upward in the reactor 110. Therefore, the different outputs D can be used to provide different fly ash products with different levels of residual carbon. Note that the output 170 on conduit 171 is substantially free of targeted trace metals.

Figure 2A:
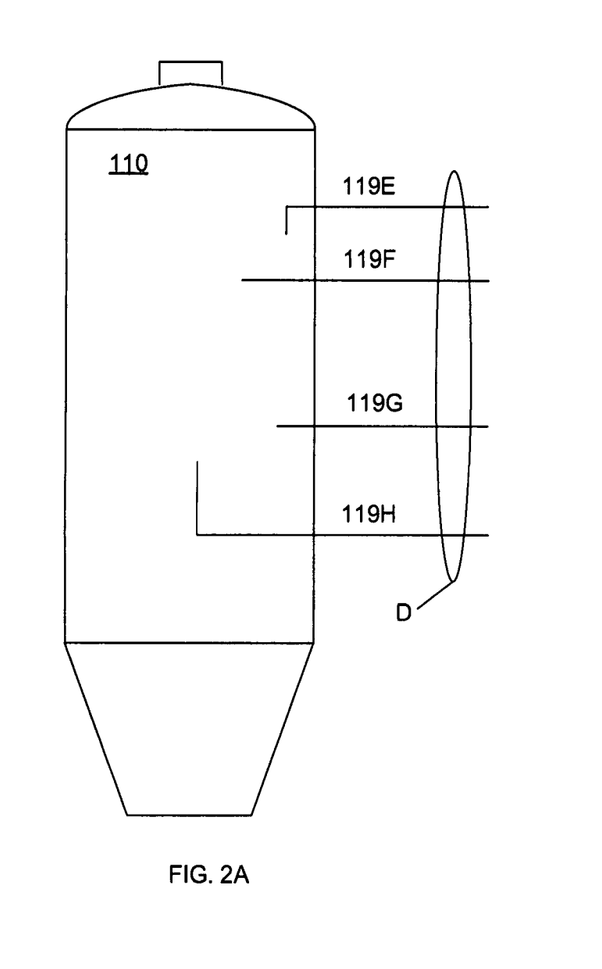
FIG. 2A illustrates one exemplary embodiment for the extraction of processed particulate matter from various points within a reactor.
Figure 2B:
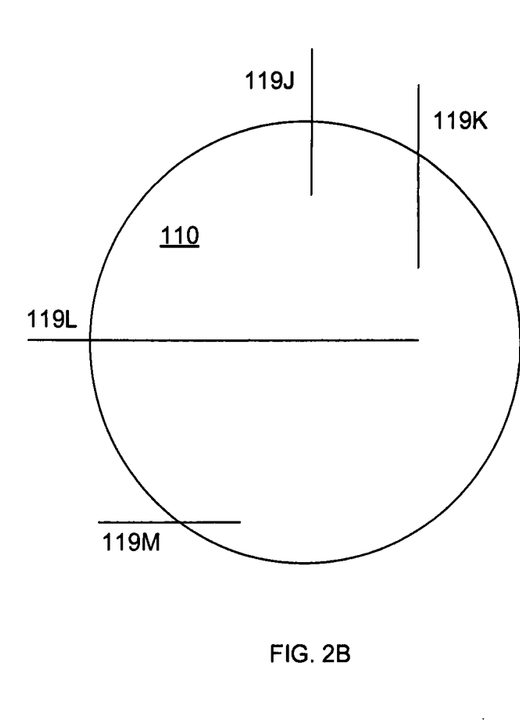
FIG. 2B illustrates another exemplary embodiment for the extraction of processed particulate matter from various points within a reactor.

FIGS. 2A and 2B illustrate two exemplary embodiments for the extraction of fly ash from within the reactor. In FIG. 2A a plurality of probes 119E-119H, collectively designated as providing an output D, project into the reactor. As can be seen, probe 119E is turned downward so it can extract beneficiated fly ash at a different level than the level at which it enters the reactor. Conversely, probe 119H is turned upward so it can extract beneficiated fly ash at a different level than the level at which it enters the reactor. Probes 119F and 119G extract fly ash at the same level at which they enter the reactor. Also note that, in the illustration as drawn, each probe is extracting fly ash at a different point radially with respect to the center of the reactor. One could also have a plurality of probes around the reactor, all at the same level, but each projecting a different distance into the reactor. One could also have a plurality of probes around the reactor, all projecting the distance into the reactor, but each being at a different level.

In FIG. 2B a plurality of probes 119J-119M project into the reactor 110. Probes 119J and 119L are projecting radially through the interior of the reactor, but probes 119K and 119M are projecting tangentially.

Thus, as shown in FIGS. 2A and 2B, it is possible to use the probes 119 to extract beneficiated fly ash from any desired height within the reactor, and from any desired point at a desired height within the reactor. This allows selection, if desired, of fly ash with different residual carbon levels and different particle sizes.

Referring again to FIGS. 1A-1C, the system and process shown and described can be used to control desired characteristics of the various particulate output streams by controlling the temperature of the reactor 110 and/or the amount of re-injected ash, primary air, secondary air, and/or cooling spray provided. The residual carbon in the resulting fly ash particles may also be controlled by adjusting the amount or distribution of primary and/or secondary air, and or the temperature, such as by controlling the cooling spray, or by the feedstock distribution, or by the solids reinjection rate, or by the mass flux in the reactor. For example, if it is desired that the output C have more residual carbon, then the amount of primary air provided and/or the amount of secondary air provided to the reactor 110 may be adjusted to influence the stoichiometric conditions of either the lower or upper part of the reactor.

Typical ranges for feedstock ash are from 5% to 20% Loss On Ignition (LOI), and typical ranges for the output fly ash particles are from 0.1% to 5% LOI.

The part of the processed fly ash which is metal laden can be used in products, such as concrete, that do not restrict the presence of these contaminants and which will serve to reduce their potential toxicity and/or sequester them, as in the case of selenium, for example, through entombment in the cementious paste matrix of concrete products.

Processing fly ash as described herein provides multiple separate streams of differently-sized fly ash. The process can be operated in such as way as to size-classify the product fly ash, modifying the particle size distribution and tailoring it to the expectations and/or requirements of particular markets, such as high-value mineral fillers for plastics and paints. A typical, although not an exclusive, use of the larger/coarser fly ash particles that are substantially free of trace metals is as functional fillers in rubbers and plastics. A typical, although not an exclusive, use of the medium-sized fly ash particles that are substantially free of trace metals is as functional fillers in paints and plastics. A typical, although not an exclusive, use of the fine fly ash particles that are substantially free of trace metals is as functional fillers in paints and other coatings.

In addition to removing trace metals and carbon, it should be noted that this process can also be used to reduce or remove many other contaminants, further enhancing its value in certain consumer products and some manufacturing processes, especially high-temperature processes. The process can also capture these contaminants and sequester them in beneficiated fly ash.

Although the above embodiments particularly discuss the handling of targeted trace metals and other contaminants so as to cause these contaminants to be present in only one of the outputs, the invention is not so limited. Rather, within the temperature limits imposed by the physical limitations of the PCDs and heat exchangers, this invention may be used to cause other contaminants or undesired chemicals to be reduced in some fly ash output products and concentrated in other fly ash output product(s) by selecting when the temperature is to be reduced, and by how much the temperature is to be reduced. For example, if there are two contaminants, contaminant A having a vaporization point of 2100 degrees F., and contaminant B having a vaporization point of 1900 degrees F., then cooling the flue gas to, for example, 2000 degrees F. will cause contaminant A to condense on the fly ash particles. Contaminant B would remain in the flue gas and could then be removed by another process.

The process described herein is preferably operated as a continuous process.

Residual unburned carbon contained in by-product fly ashes can be partially reduced, to a desired level, or can be totally removed from the fly ash, thereby resulting in a purified mineral matter.

Particles of "carbon char", which in effect are agglomerates of coal coke and inclusions of inorganic mineral matter, can be volatized, leaving only the former inclusions of mineral matter, while vaporizing inorganic matter, such as alkali salts, that condensed on inorganic ash particles during initial coal-firing and that functions as a "fouling" glue to agglomerate inorganic ash particles.

Consequently, the processed fly ashes are fine, and the Strength Activity Index (SAI) of the processed fly ash is higher than the norm for other Class F fly ashes in the marketplace and are higher than typical SM values for low-calcium fly ash. The SM of the processed fly ash can therefore be increased by processing the fly ash as described herein.

The amount of trace metals or other contaminants on the product can be controlled or eliminated by altering the operating conditions at various locations in the process, thus allowing for a purified mineral matter.

The process operates at temperatures that are high enough to burn off residual organics comingled in the fly ash, including coal char particles and other unburned organics from alternative fuels.

Oxidizing the residual unburned carbon in the raw fly ash improves the air-entraining characteristics of the processed fly ash used in the production of concrete. Oxidized unburned carbon adsorbs less of the chemical air-entraining agents (AEAs) used to produce concrete. This "oxidizing treatment" for unburned carbon will change the surface chemistry of the carbon, increasing its polarity. This process is sometimes referred to as carbon "passivation". The polarity of the mineral matter and residual carbon can be changed so as to decrease the amount of active surface sites in the processed fly ash or to leave a portion of the active surface sites intact or to increase the amount of active surface sites by processing fly ash in a reducing atmosphere. Therefore, in this example, a fly ash product can be produced with AEA characteristics which match other supplementary cementious materials that are used in a particular concrete.

If desired, only a portion of the organic carbon may be burned, especially the partially burned/coked carbon from the reactive coal macerals, while still oxidizing the active surface sites on the remaining organic carbon without volatizing it. In addition, raw fly ash may also contain inorganic carbon, such as carbonates. This inorganic carbon is not highly adsorptive and, therefore, does not negatively impact the concrete air-entraining characteristics of the fly ash. This inorganic carbon can, however, be volatized along with the organic carbon, thereby increasing the polarity of the processed fly ash. For example, the LOI of the processed fly ash can be reduced to below 0.5%, and even further, but then the organic carbon content is below the minimum detection limit of most common tests. This effect is highly advantageous when the product is used in water-based substrates, such as hydraulic cementious concrete, because the increased polarity of the products "wets" more efficiently and, therefore, requires less water to attain the desired viscosity (e.g., slump). Preferably, however, the organic carbon and some of the inorganic carbon are volatized, but not all of the inorganic carbon is volatized, thereby minimizing carbon emissions from the process.

Fly ash mineral matter is, by its nature, mostly polar. Therefore, increasing the polarity of any unburned carbon remaining in fly ash reduces one major cause of heterogeneity in fly ash. Of course, there will still be several other differences between the remaining unburned carbon and the mineral matter, such as particle density and color. Increasing the polarity of unburned carbon, however, will allow fly ashes containing some unburned carbon to be used in a number of manufacturing processes that would not otherwise be able to use fly ash.

For example, the adsorptive nature of unburned carbon in fly ash has been a major barrier for entry into a number of high-value, mineral filler markets. Oxidizing treatment of residual unburned carbon in fly ash allows these fly ashes to be more easily compounded and reduces their affinity to adsorb expensive chemicals with polar endpoints or small polar particles, such as water.

Color also affects the market for some products. In some cases, the processed fly ash has little or no carbon but has a slightly tan color. It is believed that is due to at least some of the included iron being oxidized to change from magnetite, which is black, to hematite, which is red.

The benefits provided by the present invention are not limited to reducing residual carbon levels in fly ash. The finely-divided nature of the processed fly ash results in improvements in the strength of concrete made using the processed fly ash. This benefit also appears when a high calcium (approximately 25% CaO) fly ash was processed; the concrete made with the processed fly ash was stronger than the unprocessed fly ash. Further, Class F fly ash and Class C fly ash were blended and processed to provide a Class F fly ash with the strength-producing characteristics of Class C fly ash.

A typical large char particle (approximately 100 microns) contains hundreds of small ash particles, ranging in size from 30 microns to sub-micron size. A typical smaller char particle (approximately 35 microns) also contains a number of small ash particles, ranging from 5 microns to sub-micron size. Processing as described herein combusts the carbon, thereby freeing these small ash particles from the char particle and increasing the amount of extremely fine ash particles in the processed fly ash as compared to the original, unprocessed fly ash.

A type of agglomerate that can be found in coal fly ash results from "ash fouling" and subsequent soot-blowing activities that take place in most coal-fired boiler operations. Ash fouling happens as hot flue gases are cooled in coal-fired boilers, especially on or near the water walls and boiler tubes. Vaporized inorganics, especially alkaline earth metals, condense on these cooler surfaces, act as a "sticky glue", and capture many individual ash particles, thereby creating a build-up on the cooler surfaces of the boiler. As the build-up increases, soot blowing and other cleaning methods are used to dislodge these deposits from the walls and tubes of the boiler. Some of the dislodged deposits survive as "fouled agglomerates" and are collected with the fly ash. The fouled agglomerates which are often found in the by-product fly ashes are typically held together by this "glue" of alkaline earth metals. Processing as described herein reduces the quantity of this type of agglomerate to negligible levels, further increases the fineness of the fly ash, and improves the spherical morphology of the particles. These effects increase the yield of ultra-fine fly ash and improve the yield and particle quality (sphericity) of the mineral matter when used as functional filler to make composites via extrusions and injection molding.

In addition to carbon and selenium, raw fly ash may also contain sulfur and variety of trace metals, such as aluminum, arsenic, barium, beryllium, cadmium, calcium, chromium, cobalt, copper, iron, lead, magnesium, manganese, mercury, nickel, polonium, silver, sodium, titanium, vanadium, and zinc. Although the concentration of most of these elements is fairly low, some markets are very intolerant of certain elements, and the amount of attention given to some of these contaminants is significant. For example, mercury is listed by the EPA as a "persistent bio-accumulative toxic chemical," which means that it is not only toxic, but, because it cannot decompose to become less toxic, it persists in the environment and eventually bio-accumulates in the food chain.

The term "contaminant", as used herein, includes any substance which devalues or limits the use of a raw material and the removal of that contaminant is often referred to as beneficiation or remediation of the raw material. Removal of a contaminant may be accomplished, as described herein, by combusting the contaminant, by vaporizing or volatizing the contaminant so that the material can be extracted while the vaporized or volatized contaminant is still vaporized, or by vaporizing or volatizing the contaminant so that the material can be extracted while the contaminant is vaporized and then recapturing the vaporized or volatized contaminant.

For example, the elements and chemicals mentioned above, as well as ammonia, nitrites, nitrates, sulfites, sulfates, metals, etc., may be considered to be contaminants in certain products. In addition, depending upon the feedstock involved and the purification desired, carbon in certain forms or even in any form may be considered to be a contaminant, such as activated carbon, unburned or partially burned organics or biomass, coal char, hydrocarbons, etc. It should also be noted that an element or compound may be considered to be a contaminant in one product, but is desirable or at least not undesirable in another product. For example, the presence of a heavy metal in any detectable amount is generally considered to be undesirable in any application where children are involved as children often lick or even eat things which an adult would not. In concrete, however, the presence of a heavy metal is generally not considered to be a problem. Even water may be considered to be contaminant. For example, fly ash has often been stored in landfills, where it eventually becomes wet. Wet fly ash is undesirable in most, if not all, concrete applications because the water content is variable and can adversely affect the strength and/or curing time of the concrete. Thus, water is a contaminant when it is present with fly ash.

Generally speaking, when coal is fired in a boiler, some metals contained in the coal are vaporized or volatilized and travel in the hot flue gases along with the fly ash. Depending on how these metals speciate, and the temperatures involved, a portion of them may adsorb onto the fly ash. Therefore, the amount of trace metals on the beneficiated fly ash can vary according to where the ash is removed from the process. For example, the selenium content in the processed fly ash taken from two different locations may vary by nearly two orders of magnitude. The particular operating temperatures required to vaporize, volatize and/or condense these trace metals on fly ash, as well as the specific amount metals captured on fly ash, will vary depending on the particular metal, type of coal, and how the metal speciates. Processing as described herein, along with appropriate selection of the operating temperatures and cooling, can result in a contaminant being deposited only on the processed fine fly ash, thereby rendering the larger fly ash particles to be substantially or completely free of that contaminant.

Processing as described herein will cause the vaporization of certain metals that were captured with the fly ash. Most of these metals are already oxidized and processing the fly ash as described herein will only further increase the level of metal oxidation. Oxidized metals are generally much easier to capture through adsorption than non-oxidized metals and, therefore, trace metals adsorbed on the fly ash stays with the fly ash when it is separated from the flue gas stream by the plant's particulate collection equipment. As the vaporized metals and fly ash are transported by the hot flue gases through the heat exchangers, the flow is cooled to temperatures below the condensation temperature of the vaporized or volatized metals so the vast majority of the vaporized metals condenses on the fine fly ash and is collected along with the processed fine fly ash.

In addition to the processing of fly ash, the apparatus described above can be used for the processing of silica fume, which is the smoke byproduct of producing silicon metal or ferrosilicon alloys. Silica fume consists primarily of amorphous (non-crystalline) silicon dioxide (SiO2). The silica fume contains very fine silica particulate matter, which is desirable in some applications, such as for cement in accordance with ASTMC 1240, but the particulate matter also contains unburned carbon, which is undesirable. The individual particles are extremely small, approximately 1/100th the size of an average cement particle. Because of its fine particles, large surface area, and the high SiO2 content, silica fume is a very reactive pozzolan when used in concrete. Concrete containing silica fume can have very high strength and can be very durable.

If the silica fume has a sufficiently high carbon content then it can be processed by itself in the same manner as the fly ash is processed. If, however, the carbon content of the silica fume is not adequate to maintain the necessary temperature in the reactor then heat can be added by combusting fuel, such as is done to initially heat the reactor. This, however, raises the expense of operation. Preferably, if the carbon content of the silica fume is too low, then the silica fume and fly ash are processed simultaneously in the reactor, with the fly ash providing the additional heat necessary to maintain the appropriate temperature for burning the carbon out of the silica fume. The comingled beneficiated silica fume and beneficiated fly ash can be used, for example, in concrete.

The beneficiated silica fume and beneficiated fly ash can also be separated and used separately in different concrete applications. Silica fume particles are extremely small, with more than 95% of the particles being less than 1 micrometer. The particle size of beneficiated fly ash particles ranges from sub-micron to above 100 micrometers. Most of the beneficiated fly ash particles, however, are larger than 1 micrometer. Therefore, particle size is a convenient manner of separating the beneficiated silica fume from the beneficiated fly ash. For example, outputs B and C (FIG. 1), output 131 (FIG. 1B), and output 159 (FIG. 1C) can provide beneficiated fly ash, while output 141 (FIGS. 1B and 1C) can provide beneficiated silica fume which is metal-laden.

Optionally, heat exchangers 135 (FIG. 1B) and 165 (FIG. 1C) will not cool the hot gases to the condensation point of the vaporized metal. Therefore, the output 143 (FIGS. 1B and 1C) will be silica fume with little or no the metal, but the exhaust gas output 141 will contain the vaporized metal, which can be removed by a subsequent process (not shown).

In addition to the carbon reduction, metal-capture, and other benefits described above, the apparatus described above can be used for the processing of other particulate matter to modify its physical and chemical characteristics. The reactor 110, with input and output ports indicated thereupon, provides a high-temperature, dynamic reaction chamber having controllable operating conditions. The beneficiation of the fly ash typically produces heat energy in excess of what is required to maintain the reactor at the desired temperature. Therefore, the excess heat may be captured, for example, in the exhaust gas output at conduit 142, to provide energy for another process. This same energy can also be used to process other materials in the reactor 110, especially those wherein an endothermic reaction occurs. Furthermore, the fly ash is mostly inert material, and generally will not chemically react directly with other substances which are injected into the reactor 110. The carbon in the fly ash, although capable of being in chemical reactions with substances which are injected into the reactor, is generally combusted and not available for reactions. The beneficiated fly ash and the processed material can be separated in any appropriate manner but a convenient method of separation is by particle size.

For example, metakaolin clay is very desirable for use in concrete. Like other pozzolans (fly ash and silica fume are two common pozzolans), metakaolin reacts with the calcium hydroxide (lime) byproducts produced during cement hydration. In this use, metakaolin boosts the compressive strength, makes finishing easier, reduces efflorescence, mitigates alkali-silica reaction, and maintains color, especially in white concrete. Metakaolin is refined kaolin clay that is fired (calcined) under carefully controlled conditions to create an amorphous aluminosilicate that is reactive in concrete. Kaolin is transformed into metakaolin by the controlled application of heat (temperature of approximately 750 degrees C., 1382 degrees F.) which releases water from, and changes the chemical composition of, the Kaolin through dehydroxilization. With reference to FIGS. 1A-1C, the reactor 110 is heated to approximately this temperature, and then the fly ash and kaolin are introduced. The beneficiation of the fly ash provides the heat needed for the calcination of the kaolin to produce metakaolin. The particle size of metakaolin is less than the average particle size of fly ash: 80% of the metakaolin particles have a size less than 2 micrometers. Therefore, particle size is a convenient manner of separating the metakaolin from the beneficiated fly ash. For example, outputs B and C (FIG. 1), output 131 (FIG. 1B), and output 159 (FIG. 1C) can provide beneficiated fly ash, while output 141 (FIGS. 1B and 1C) can provide metakaolin which is metal-laden.

In addition to kaolin, other materials can also be calcined including, but not limited to, calcination of Bayer gibbsite to produce alumina and "red mud", and calcination of bauxite to remove crystalline water. The red mud can then be processed later to separate the heavy metals.

Optionally, heat exchangers 135 (FIG. 1B) and 165 (FIG. 1C) will not cool the hot gases to the condensation point of the vaporized metal. Therefore, the output 143 (FIGS. 1B and 1C) will be metakaolin with little or no metal, but the exhaust gas output 141 will contain the vaporized metal, which can be removed by a subsequent process (not shown).

Another example of use is the processing of tar sands. Tar sands (also sometimes referred to as oil sands) are a combination of clay, sand, water, and bitumen (a heavy black viscous oil). Tar sands can be mined and processed to extract the bitumen, which is then refined into oil. The processed sands are then typically returned to the pit or area from which they were mined. The extraction process is not, however, 100% efficient, so some of the bitumen remains. In addition to losing the value of the bitumen which is not extracted, the remaining bitumen is now considered by some authorities to be an environmental contaminant and returning the processed sands, with the remaining bitumen, to the pit or area from which they were mined is prohibited. Thus, the processed tar sands must then be cleaned or transported to an approved dumping site, which increases the cost of the mining and extracting operations. The processed tar sands can, however, be further processed by the system described herein. The processed tar sands are injected into the reactor 110, whereby the remaining bitumen, any remaining water, and any chemicals used to extract the bitumen from the sands, are combusted or removed from the tar sands. The resulting tar sands are free of bitumen and other contaminants, and can then be returned to the pit or area from which they were extracted, or can then be used for another purpose.

Although operation has been described with particularity with respect to the use of fly ash, the present invention is not so limited. Any fine particulate matter can be injected into the reactor, such as, but not limited to, unburned or partially burned biomass, wood ash, switch grass, hog manure, chicken litter, etc. If the feedstock has a caloric value that will provide sufficient heat from combustion to obtain the desired reactor temperature then that feedstock may be used by itself. If the caloric value is inadequate then additional heat may be added by the burning of fuel, which may be injected by using, for example, one or more of the ports 119, or by the addition of another feedstock which provides the required additional caloric value.

The method and apparatus described herein may therefore be used to remove a contaminant from a fine particulate matter feedstock, or to convert the fine particulate matter feedstock to a different product. Other benefits of, and variations of, the method and apparatus described herein may suggest themselves based on a reading of this application.

The invention claimed is:

1. An apparatus, comprising:
   a single, dilute solids phase reactor having a top section, a central section, and a bottom section with an exit port, and a top particle output port, the top particle output port being located on or near the top section to provide for removal of exhaust gas and particles from the reactor, the exit port being located on or near the bottom for removal of particles other than those particles passing through said top particle output port; said reactor in communication with a solids return control device in communication with a mixer;
   a plurality of particle injection devices and a plurality of air injection devices situated at a plurality of heights on the reactor and arranged so particulate matter containing metal contaminant is injected into the reactor at a height above an adjacent air injection device;
   a particulate collection and cooling system connected to said solids return control device, said particulate collection and cooling system operates to separate gas from at least a portion of said particles exiting from the top particle output port of the reactor in stages, in series and at different temperatures, said particulate collection and cooling system comprising first, second and third particulate collection devices (PCD) a heat exchanger and a mixer, said first particulate collection device is in communication with said solids control return device and comprises an inlet, an exit port and an output port and operating in a first temperature range to remove at least a portion of the particles at a first temperature within said first temperature range through said exit port, said output port of said first particulate collection device is in communication with a second PCD operating in a second temperature range, and comprising an inlet, an exit port and output port, said output port is in communication with said heat exchanger, said exit port of said second particulate collection device is in communication with said mixer, and at least a portion of particles entering said second PCD are removed at a second temperature within said a second temperature range and below said first temperature through said particle output port and a remaining portion of the particles passing through the output port of said second PCD to said heat exchanger are cooled within said heat exchanger which is in communication with said third PCD, said third PCD comprising an inlet, a particulate exit port and gas exit port, whereby particles exiting said third PCD contain a level of metal contamination above the level of particles passing through the exit ports of said first and said second PCD.

2. The apparatus of claim 1, and further comprising an output selector to selectively combine the first and second particle outputs to provide a combined output.

3. The apparatus of claim 1 wherein said solids return control device contains a valve to divert a selected portion of the particle output from said exit port of said first PCD to at least one of said injection devices.

4. The apparatus of claim 1 wherein at least one of the injection devices is a secondary air injection device.

5. The apparatus of claim 1 wherein at least one of the plurality of injection devices is a liquid spray injection device situated on the central portion of the reactor.

6. The apparatus of claim 1 wherein the temperature inside the top section of said reactor is above the condensation temperature of said metal contaminant.

7. The apparatus of claim 1, wherein the particulate matter is one of fly ash or silica fume injected into the reactor.

8. The apparatus of claim 1, wherein the particulate matter is fly ash and kaolin injected into the reactor.

9. The apparatus of claim 1, and further comprising a plurality of intermediate output ports on the central section of the reactor to provide a corresponding plurality of intermediate particle outputs, the intermediate output ports being located below the exit port and above the first particle output port, a first intermediate particle output providing particles from a first location within the reactor, a second intermediate particle output providing particles from a second location within the reactor, the second location being different from the first location in at least one aspect.

* * * * *